United States Patent [19]
Parker

[11] 4,322,617
[45] Mar. 30, 1982

[54] METHOD AND APPARATUS FOR CALIBRATING A GAMMA COUNTER

[75] Inventor: Stephen D. Parker, Erlanger, Ky.

[73] Assignee: Fleit & Jacobson, Washington, D.C.

[21] Appl. No.: 11,702

[22] Filed: Feb. 12, 1979

[51] Int. Cl.³ .......................... G01D 18/00; G01T 1/20
[52] U.S. Cl. ..................................... 250/252; 250/362;
 250/363 R; 250/369
[58] Field of Search .................. 250/252, 361 R, 369,
 250/362, 363 R

[56] References Cited
U.S. PATENT DOCUMENTS 4,060,726 11/1977 Luitwieler et al. ................. 250/252
4,078,178 3/1978 Lowes ............................ 250/252 X

*Primary Examiner*—Davis L. Willis
*Attorney, Agent, or Firm*—Fleit & Jacobson

[57] ABSTRACT

Method and apparatus for calibrating a gamma counter, such as a fibrinogen monitor, employing a pulse-height analyzer and a control circuit to determine the optimum high-voltage setting on the photomultiplier tube of a scintillation counter. A first pair of upper and lower pulse-height levels are automatically selected and counts measured to determine if the spectrum of the radioactive source is positioned correctly in the pulse-height domain. A series of measurements are made with differing high-voltage settings to ascertain the desired location of the spectrum. A second pair of upper and lower levels is provided for use in the actual monitoring operation and is automatically set after each calibration operation.

10 Claims, 5 Drawing Figures

METHOD AND APPARATUS FOR CALIBRATING A GAMMA COUNTER

BACKGROUND OF THE INVENTION

The monitoring of radioactive fibrinogen in order to detect the formation of blood clots (thrombii) in hospital patients has now become commonplace and is just one example of a practical use for a gamma counter. Briefly stated, the procedure employs fibrinogen, a component of the blood which aids in blood clotting. The fibrinogen s labeled with a radioactive element, typically Iodine-125, and then a scintillation counter is employed to detect the gamma rays which are emitted by the radioactive element as it decays. As is well known, a typical scintillation counter employs a photomultiplier tube and some form of phosphorous-type surface to receive the emitted gamma radiation. Quite frequently the phosphorous type surface is a sodium iodide crystal. The photons emitted by the sodium iodide crystal are detected and amplified by the photomultiplier tube, wherein the height of the pulse outputs of the photomultiplier tube are proportional to the number of photons emitted by the sodium iodide crystal.

The fibrinogen monitor, just like all gamma counters, must be calibrated before each use so that the data obtained may be meaningfully interpreted. Generally, the calibration involves the setting of an upper and lower counting-level limit and then the use of a monitoring detector and a sample of the radioactive label used as a reference source. The characteristic spectrum of the decay of the radioisotope being employed is already known and the calibration procedure involves positioning the upper and lower counting levels at certain locations in this spectrum, so that the peak of the spectrum occurs substantially at the midpoint between the upper and lower counting levels. Generally, the fibrinogen monitor is then operated and a histogram of the response is then plotted. This histogram is a spectrum of the pulse heights plotted in the pulse-height domain. The histogram is then reviewed to determine if the counting levels are positioned substantially around the midpoint of the spectrum. If it appears from the calibration histogram that the levels are not positioned around the peak of the spectrum, then the spectrum can be shifted by adjusting the high voltage on the anode of the photomultiplier tube. As is well known, the gain of a photomultiplier tube is based on the logarithm of its anode voltage. Continuing with the conventional calibration then, the anode voltage of the photomultiplier tube is adjusted and another histogram of the output is plotted. A review of this second histogram will again indicate whether the peak of the spectrum lies on the midpoint of the counting range as determined by the upper and lower levels. Quite frequently the anode voltage will have to be adjusted three or four times and the sample remeasured until the resultant histogram indicates the correct location of the spectrum peak vis-a-vis the upper and lower counting levels. It is, of course, appreciated that the plotting of the histogram is a relatively time-consuming process and quite frequently requires at least one-half hour to properly plot each histogram.

SUMMARY OF THE INVENTION

The present invention provides a calibration system and circuit which provides a convenient and accurate method of calibrating a gamma counter, e.g., a fibrinogen counting monitor. The present invention teaches the use of two calibration levels in addition to the conventional counting-level limits. These additional calibration level limits are automatically provided during the calibration process and cooperate with a variable gain amplifier and a pulse-height analyzer to determine the location of the count spectrum of the radio labelled isotope being detected at the known anode voltage.

The present invention establishes four separate threshold levels corresponding to anode voltages on the photomultiplier tube. The levels are an upper and lower counting level and an upper and lower calibration level. These levels are selected so that the calibration window, which is the difference in energy levels selected by the pulse-height analyzer, straddles the pulse amplitude having the highest repetition rate in the spectrum of the radioisotope. This positioning of the calibration window by selecting the limits is done in such a way that, when the high voltage is adjusted, the entire peak will be located substantially within the calibration window. This condition also results in a local maximum pulse rate in the counting window as the high voltage on the photomultiplier tube anode is varied.

Therefore, it is an object of the present invention to provide an easy and accurate method for calibrating a gamma counter.

It is a further object of the present invention to provide an easy and accurate method for calibrating a fibrinogen monitor.

It is a still further object of the present invention to provide apparatus for quickly and accurately calibrating a gamma counter.

It is another object of the present invention to provide apparatus for quickly and accurately calibrating a fibrinogen monitor.

It is another object of the present invention to provide a fibrinogen monitor calibrating system which employs an additional calibration window to determine the pulse amplitude having the highest repetition rate of the spectrum of a radioisotope.

It is another object of the present invention to provide a calibration window which will eliminate noise during the calibration process.

It is another object of the present invention to provide a fibrinogen monitor calibrating circuit which automatically reverts to the counting mode once the calibration operation has been accomplished.

It is a still further object of the present invention to employ a more stable isotope of the radioactive material for the calibration operation than that which is used in the monitoring operation.

The manner in which these and other objects are accomplished by the present invention will become clear upon a review of the following detailed description and drawings.

DETAILED DESCRIPTION OF THE INVENTION

The present invention is suitable for use in any gamma ray counter and will be described hereinbelow in an embodiment suitable for use with a clinical type fibrinogen monitor.

Figure 1:
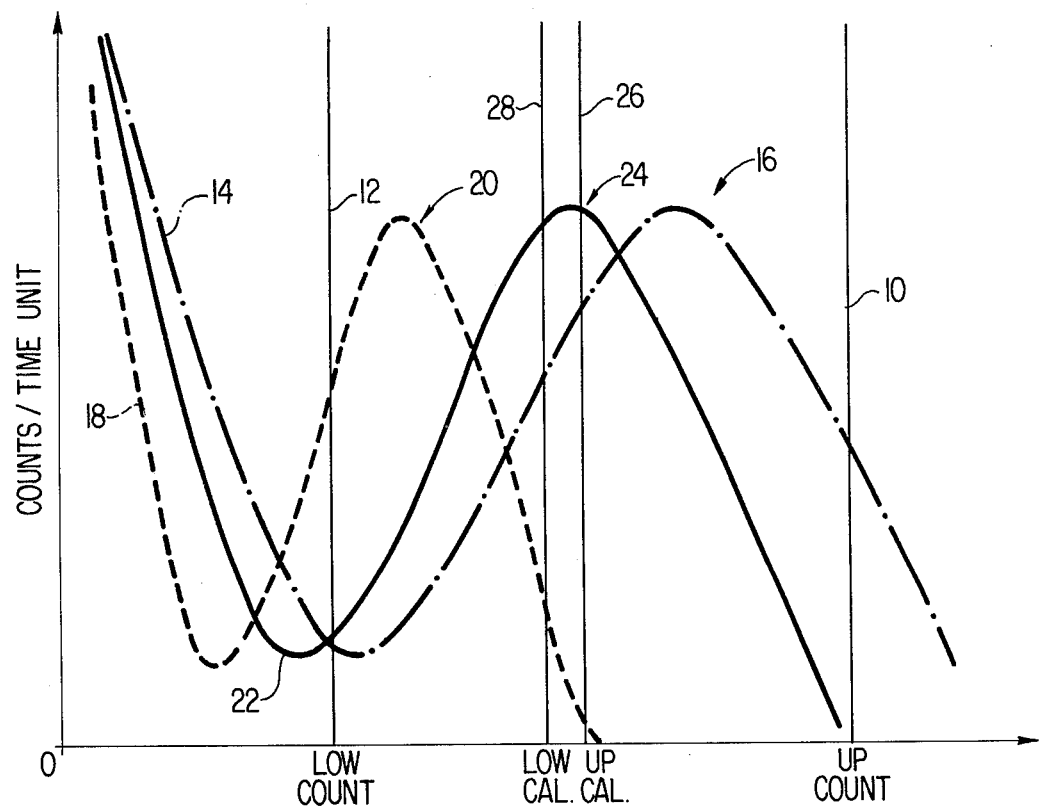
FIG. 1 is a graph of the spectrum of a radioisotope showing various locations of the spectrum in the pulse-height domain as a function of photomultiplier tube anode voltage.

Referring now to FIG. 1, the pulse height spectrum of Iodine-129 is shown. It is a feature of the present invention to employ for calibration purposes a radioisotope which is more stable than that which is employed during the measuring process. More specifically, the curves shown in FIG. 1 relate to Iodine-129, which has an extremely long half-life, whereas in the measurement mode the fibrinogen monitor employs Iodine-125, which has a half-life of only sixty days. These curves are plotted for various photomultiplier tube settings, i.e., various high voltages have been applied to the anode of the photomultiplier tube of the conventional scintillation detector. It is well known that the gain of the photomultiplier tube is a logarithmic function of the high voltage applied to the anode. The graph is plotted in the pulse-height domain in kiloelectron volts (keV) and the pulse height is located on the abscissa axis, while the ordinate axis relates to counts per time unit.

Shown in FIG. 1 are upper and lower counting limits 10 and 12, respectively, which indicate the size of the window employed during the actual fibrinogen monitoring operation. These limits are selected based on the known spectrum of the radioisotope being utilized. In any event, this window is of such a width that a substantial number of counts will occur within the window and, as indicated above, it is the function of the calibration process to ensure that the peak of the spectrum will be located somewhere at the approximate midpoint between the lower and upper counting levels.

FIG. 1 then shows at dot-and-dash curve 14 a spectrum which was obtained with the high voltage on the anode of the photomultiplier tube set at a level which is too high. This may be readily determined since it is noted that the approximate peak 16 of this spectrum is located to the right of the approximate midpoint between the upper and lower counting levels. Similarly, dashed-line curve 18 corresponds to a pulse-height spectrum which was obtained from a photomultiplier tube having the high voltage setting on the anode set at too low a level. That is, the peak of the pulse-height spectrum is located to the left or lower-voltage side of the approximate midpoint of the upper and lower counting levels. The solid-line curve at 22 may be seen to correspond to the correct voltage setting on the anode of the tube, since the peak 24 appears to fall substantially at the midpoint between the upper and lower counting levels. Thus, it may be said that the curve 22 corresponds to a fibrinogen monitor unit which has been correctly calibrated.

In a conventional fibrinogen monitor, the process reflected in the various curves of FIG. 1 is gone through by varying the anode voltage and graphically plotting these spectrum response curves by means of the histogram technique. However, the present invention provides an additional window, namely, the calibration window, which is much narrower than the counting window. This window is seen in FIG. 1 at lines 26 and 28, which represent the upper and lower calibration limits, respectively. The present invention provides circuitry which automatically provides the narrow calibration window once the calibration operation has begun. It has been found that the center of the peak after a correct calibration procedure has been found is located approximately between 15 and 45 kiloelectron volts. The present invention provides a window straddle of approximately 30 kiloelectron volts and the window is then around 5 to 6 kiloelectron volts wide. By providing such a narrow window during the calibration process the fluctuations in the count due to change in high voltage are increased over the change expected in the counting window and the accuracy of the calibration is thereby considerably raised. It should be noted that by picking a very small window the sensitivity of the calibration procedure is enhanced. This may be seen since if the window is quite small and could contain perhaps only ten counts then if eleven counts are detected this represents a 10% deviation over the desired reading. As will be seen hereinbelow, the present invention provides a narrow window and performs the count for a preselected period of time so that approximately 1,700 counts are obtained within the calibration window.

Figure 2:
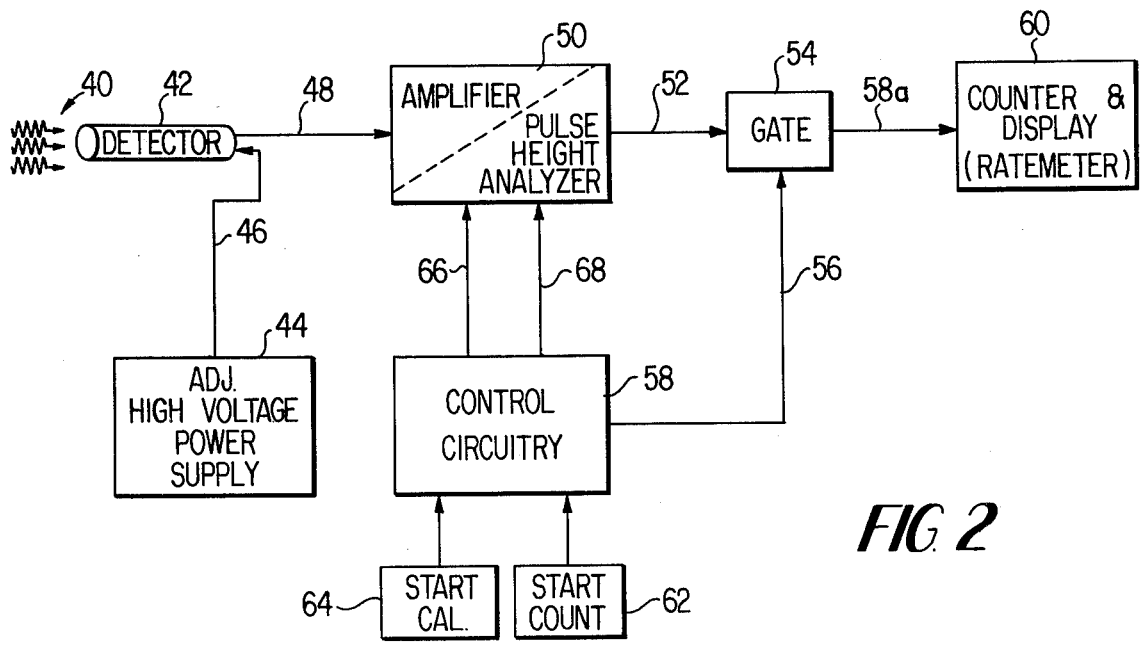
FIG. 2 is a block diagram of the counting system of a typical fibrinogen monitor.

FIG. 2 shows the counting system of a fibrinogen monitor which employs the present inventive calibration system. The gamma rays from the radioisotope are diagrammatically depicted at 40 and are detected by a scintillation detector 42 which comprises a sodium iodide crystal (which is doped with Thalium) arranged adjacent to a photomultiplier tube of conventional design. The photomultiplier tube of the detector 42 is provided with a high voltage on its anode by an adjustable high-voltage power supply 44 which is connected to the detector by line 46. The output of the detector 42 is a series of pulses whose height is proportional to the number of photons which have been emitted by the scintillation crystal upon being impinged by the gamma rays 40. This pulse signal appears on line 48 and is fed to an amplifier and pulse-height analyzer system 50, which will be shown in more detail hereinbelow.

The pulse-height anlyzer operates as is known to record or count a pulse only if its height falls within specified limits. Accordingly, a pulse-height analyzer could be said to produce a pulse-height spectrum of a group of pulses. Pulse-height analyzers are sometimes termed differential discriminators. The output of the pulse-height analyzer on line 52 is fed to a gate 54, which has as its control input on line 56, a signal produced by a control circuitry unit 58, shown in more detail hereinbelow. Once the gate 54 is opened by the signal on line 56 then the pulses on line 52 are fed on line 58a to a counter and display unit 60, which might also comprise a ratemeter. A ratemeter produces a voltage which is proportional to the number of pulses per second which are input to it times a predetermined time interval. The counter and display 60 act to display the number of counts obtained from the detector 42. This number of counts corresponds to the extent of the radiolabeled fibrinogen which has been detected in the patient's blood vessels. The control circuitry 58 is provided with a start-count switch 62 which initiates the measuring/counting operation and with a start-calibration switch 64 which is employed to commence the inventive calibration operation. The control circuitry 58 provides suitable timing and window-control signals on lines 66 and 68 to the amplifier and pulse-height analyzer system 50.

Figure 3:
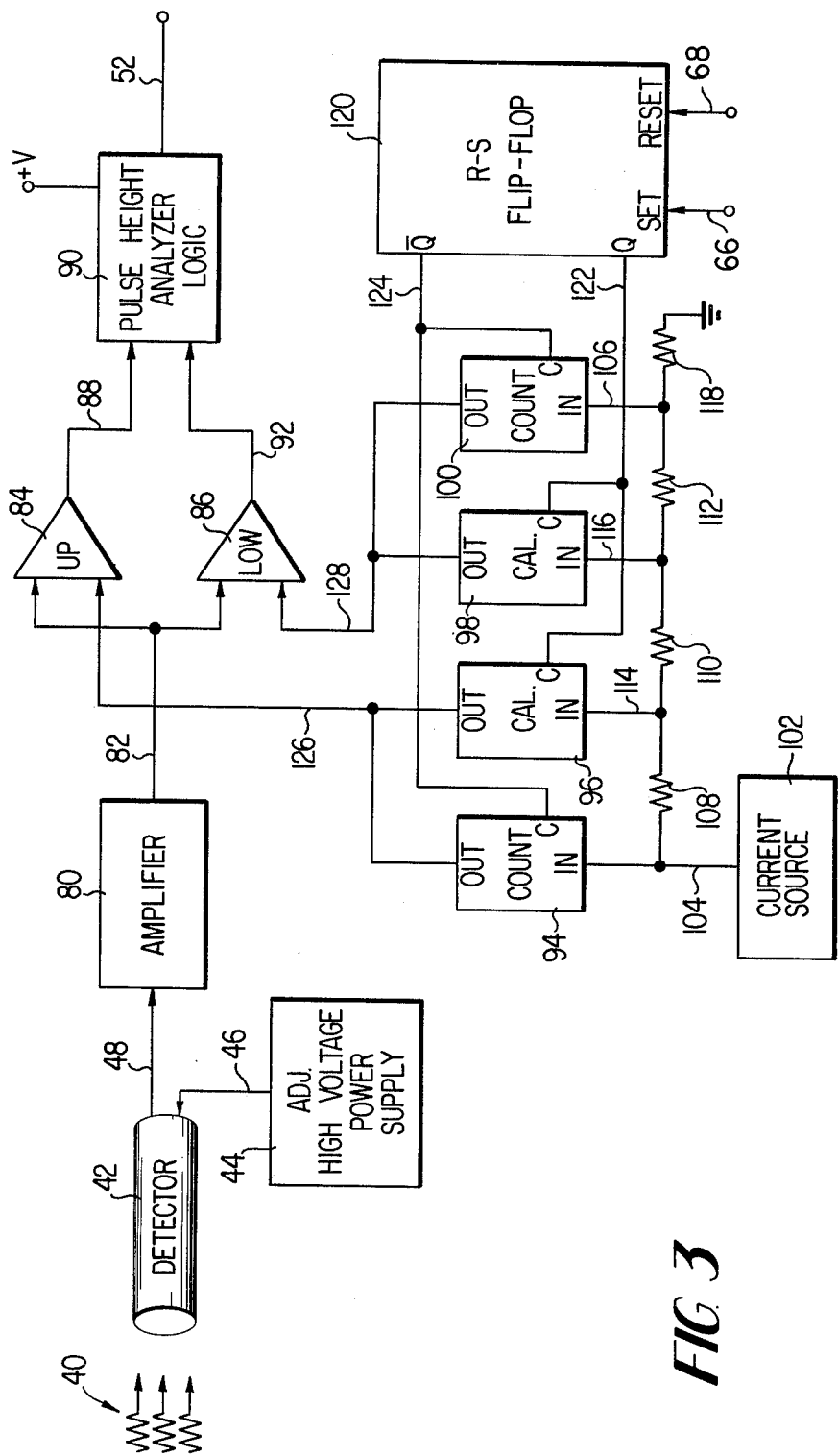
FIG. 3 is a schematic, in block diagram form, of the dual-window calibration system of the present invention.

FIG. 3 shows the circuitry provided by the present invention which establishes the calibration counting window and automatically shifts the calibration window back to the upper cutoff voltage and lower cutoff voltage, as shown in FIG. 1. During calibration, the detector 42 is arranged adjacent to a calibration source, preferably Iodine-129 and the gamma rays 40 are detected, and the pulse signal is fed on line 48 to an amplifier 80. The output of the amplifier 80 is fed on line 82 to the inputs of two comparators 84, 86 which compares it to the upper and lower calibration limits, respectively. The output of the upper comparator on line 88 is fed to a pulse-height analyzer logic unit 90, which will be shown in more detail below. The output of the lower comparator 86 is fed on line 92 to the pulse-height analyzer logic unit 90. The output of this pulse-height analyzer logic unit is fed on line 52 to the gate 54 of FIG. 2, so that it may be ultimately displayed.

The four levels shown in FIG. 1 are produced in the inventive apparatus by four analog gates 94, 96, 98, and 100. Analog gate 94 corresponds to the upper cutoff voltage of the counting operation and analog gate 100 corresponds to the lower cutoff voltage of the counting window. Similarly, analog gate 96 corresponds to the upper level of the calibration window, while analog gate 98 corresponds to the lower level of the calibration window. The operation of these analog gates is well known and such analog gate may typically comprise a field effect transistor, the operation of which is also well known. Briefly stated, an analog gate operates to pass a current when the analog gate is hit with a trigger voltage. Accordingly, the analog gates 94, 96, 98, 100 are connected to a current source 102. Each gate is thereby provided with a specific voltage and, as may be expected, these voltages are all different based upon the respective levels of the individual analog gates. The circuit source 102 feeds gate 94, which corresponds to the upper level of the counting window, directly on line 104, whereas gate 100, which corresponds to the lower level of the counting window, is fed on line 106 by the current source 102 through a series of resistors 108, 110, and 112. Accordingly, the voltage on line 106 will be substantially less than that originally appearing on line 104. Similarly, analog gate 96 which represents the upper voltage level of the calibration window will be biased or fed with a specific voltage from the current source 102 through resistor 108, and analog gate 98 is fed a specific voltage on line 116 through resistors 108 and 110. Accordingly, it may be seen that the values of the various resistors are chosen such that the voltages applied to the several analog gates will be of the appropriate levels. That is, resistor 110 will be the smallest resistor but will be only slightly less than resistor 112. An additional resistor 118 is provided for the connection to ground necessary to complete the circuit.

The appropriate analog gates will be turned on by means of an R-S flip-flop 120. The Q output of the R-S flip-flop 120 appears on line 122 and serves to turn on the analog gates that relate to the calibration operation, i.e., gates 96 and 98. Similarly, the $\overline{Q}$ output on output line 124 of R-S flip-flop 120 serves to turn on the analog gates corresponding to the counting operation, i.e., analog gates 94 and 100. Accordingly, the upper level limits, either calibration or counting, are fed to the upper comparator 84 on line 126 and the lower level limits, either counting or calibration, are fed to the lower comparator 86 on line 128. The operation of the R-S flip-flop is initiated by a "set" signal appearing on line 66, a "reset" signal being provided on line 68. The set signal relates to the start of the calibration operation and the reset signal relates to the stopping of the calibration and the beginning of the counting operation. As will be explained hereinbelow, the calibration time span is chosen to be four seconds in duration.

In operation, the start calibration button 64 of FIG. 2 is depressed which causes the control circuitry 58 to produce the start calibration timing signal on line 66 which sets flip-flop 120, thereby causing analog gates 96 and 98 to pass a current onto lines 126 and 128. Additionally, depressing the start calibration button 64 will turn on gate 54 by the signal on line 56.

The effect of the signals on lines 126 and 128 on the comparators 84 and 86 is to set the upper level and lower level calibration voltages, thereby effectively narrowing the calibration window and setting the pulse height limits for calibration. Such pulse height limits are then used by comparators 84 and 86 to generate signals indicating received pulses falling within the "window," such signals being fed on lines 88 and 92 to a pulse-height analyzer logic unit 90 before being fed outward on line 52 to gate 54 and hence to the counter and display. At the end of a four second period, the control circuitry 58 provides the signal on line 68 to the R-S flip-flop 120, which resets the flip-flop and turns off line 122 and turns on line 124. The effect of this is to close gates 96 and 98 and to open analog gates 94 and 100. This automatically sets the upper level and lower level of comparators 84 and 86 to the upper and lower voltage levels used in the counting operation. It should be noted that although a four second time period has been chosen in this embodiment, this time could be shorter or longer depending on the degree of accuracy required in the calibration operation.

Therefore, in performing the calibration operation, the adjustable high-voltage power supply 44 is first adjusted and the detector 42 arranged adjacent the calibration sample. The start calibration switch 64 is depressed and the four second calibration period is then initiated. At the end of this four second calibration time, a certain number will be displayed on the counter and display unit 60. This number, along with the power supply setting, is then recorded by the operator. The high-voltage power supply is then adjusted to a different voltage and the detector once again placed adjacent the calibration sample and the calibration start switch 64 closed. Once again at the end of a four-second period a count will be displayed on the counter and display unit 60. This count is compared with the one recorded and the larger count and its high-voltage setting are recorded. This calibration process is repeated once again and a new total count is obtained from the display 60. This count is compared with the previously recorded count to record the larger count and its high-voltage setting. This procedure may then be repeated as often as desired in order to obtain the maximum number or count on the display 60. It should be noted that typically only six or seven calibration runs will be required in order to bracket in on the high-voltage setting which produces the maximum reading on the display. By setting the adjustable high-voltage power supply to the value which produces the maximum number, the operator is assured that the spectrum of the pulse counts will be as shown at 22 in FIG. 1, i.e., the peak of the spectrum will be located midway between the upper and lower counting levels 10 and 12, respectively.

Figure 4:
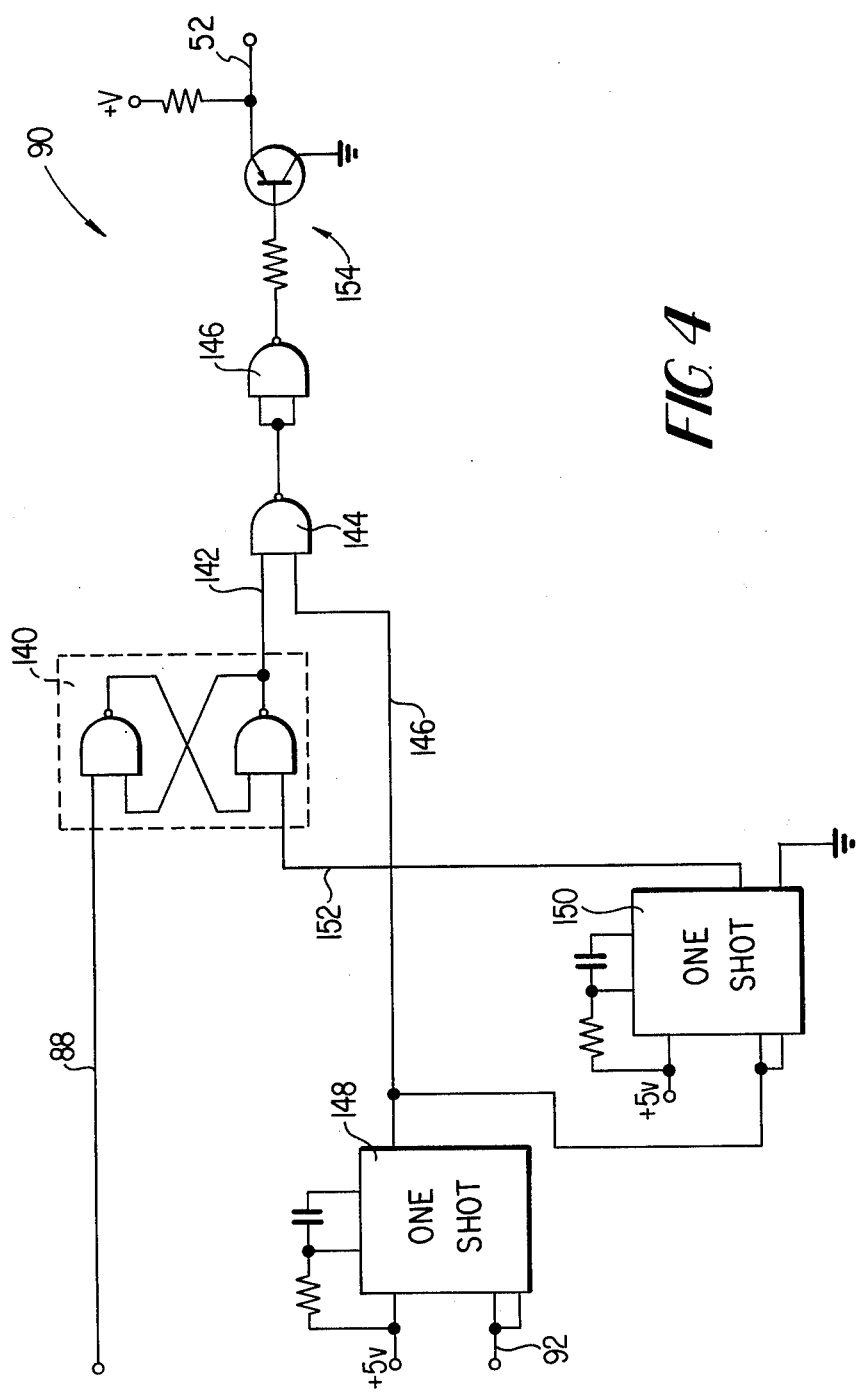
FIG. 4 is a schematic diagram of the pulse-height analyzer logic of the apparatus of FIG. 3.

FIG. 4 shows the pulse-height analyzer logic 90 of FIG. 3, in more detail. The upper limit level signal on line 88 from comparator 84 is fed as a set input to a flip-flop unit 140 and the output thereof on line 142 is fed to a NAND gate 144. The other input of NAND gate 144 is provided on line 146 from a one-shot multivibrator 148, which has as its input the lower calibration and counting levels on line 92 from comparator 86. The reset input of flip-flop 140 is provided by another one-shot multivibrator 150, which obtains its input from the output of one shot multivibrator 148. This signal appears on line 152 and serves to automatically reset flip-flop 140 after the output of flip-flop 140 passes, via line 142, through NAND gate 144, enabled by output 146 of one-shot multivibrator 148. The TTL 74121 circuits have been found to be suitable for use as the one-shot multivibrators 148 and 150. The output of NAND gate 144 is fed through an inverter 146 to a drive transistor 154 whose emitter output comprises output 52 of FIG. 4.

Figure 5:
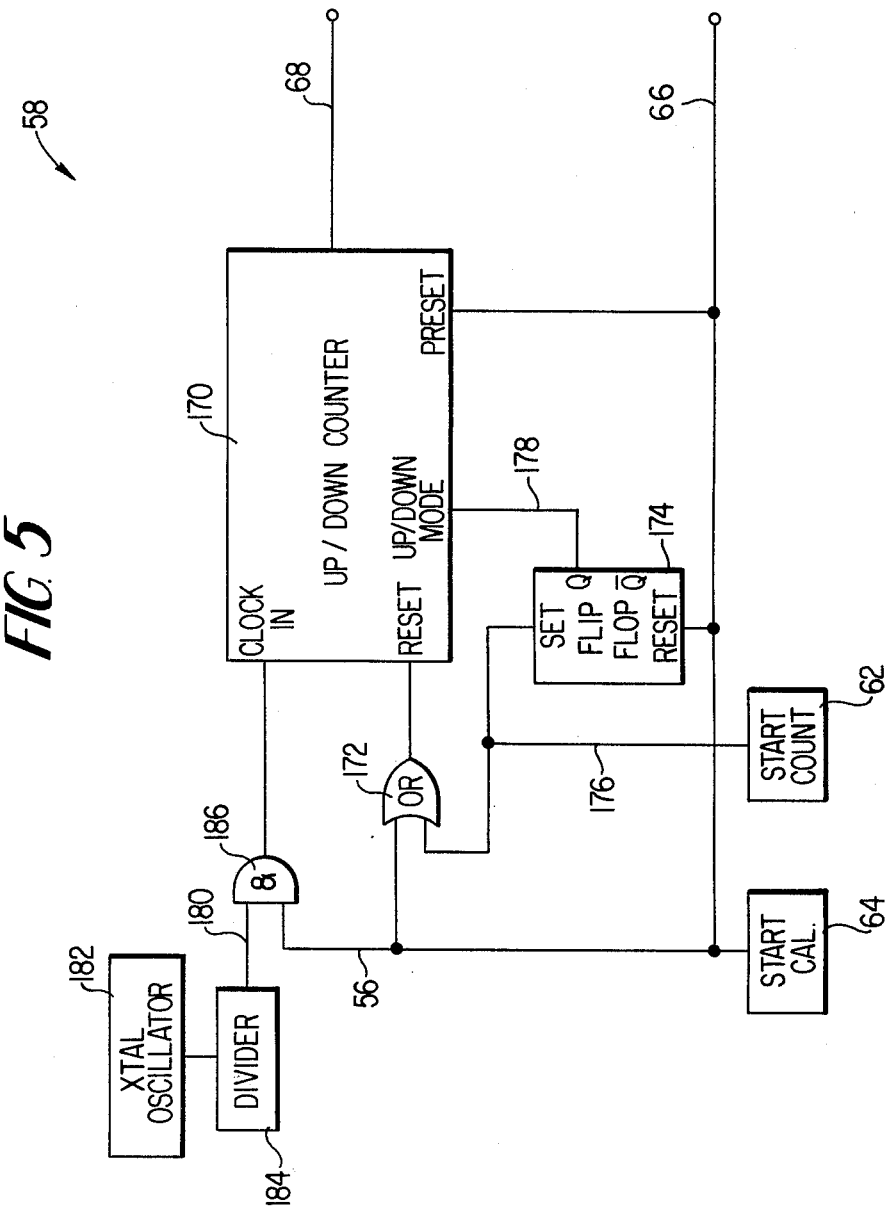
FIG. 5 is a schematic, in block diagram form, of the control circuitry of the apparatus of FIG. 2.

FIG. 5 shows the control circuitry 58 of FIG. 2 in more detail. Specifically, the start calibration switch 64 provides the signal appearing on line 56, which is fed to the gate 54 of FIG. 2, and is also fed to an up/down counter 170. This up/down counter 170 is of a conventional type; however, it has been provided with the feature of being presettable to a predetermined number. In other words, upon a signal appearing on line 56, up/down counter 170 is preset to a predetermined number from which it will be counted down. Initiation of the start calibration button 64 will also cause the signal on line 56 to be fed to an OR gate 172 which is connected to reset the up/down counter 170 so that any previous number contained in the counter will be eliminated prior to the presetting operation. The signal on line 56 is also connected to the reset terminal of a flip-flop 174. The set input of flip-flop 174 is fed from the start count button 62 on line 176. The Q output of flip-flop 174 is put on line 178 and fed to the up/down mode input of counter 170. In operation then, a logic 1 appearing on Q output line 178 will set the counter 170 in the up-counting mode and a logic 0 on line 178 will set the counter 170 in the down-counting mode. It is noted that the counter 170 is also preset to a predetermined number by the start calibration signal on line 56.

The up/down counter 170 is then provided with a series of pulses on line 180 produced by a crystal oscillator 182 and a divider 184. In the present embodiment the signal on line 180 has a frequency of 100 Hertz. This signal on line 180 is fed to AND gate 186 along with the start calibration and enabling signal on line 56, so that the up/down counter 170 is provided with a stream of clock pulses which cause it to count down from the number which has been preset by the signal on line 56. The number which is preset in the present embodiment is a count of four hundred. Were this number chosen to be higher, the calibration counting operation would take more time. Hence, by counting down at a frequency of 100 Hertz from a number of four hundred at the end of four seconds the counter will be empty and an output signal will appear on line 68. As indicated in FIG. 2, this output signal on line 68 is fed to the pulse height analyzer/amplifier unit 50. Additionally, a start count switch 62 provides a signal on line 176 which is fed to the OR gate 172 which, as indicated above, resets the up/down counter 170.

It is, of course, understood that the foregoing description of the present invention is presented by way of example only and is not intended to limit the scope thereof except as set forth in the appended claims.

I claim:

1. A method for calibrating a gamma counter of the type employing a scintillation counter with a high-voltage power supply for detecting the presence of a radioisotope, the method comprising the steps of:
   (a) providing a pulse-height analyzer connected to the output of said scintillation counter,
   (b) selecting a first pair of upper and lower pulse height amplitude levels in said pulse-height analyzer such that the spectrum of said radioisotope lies between said first pair of levels,
   (c) selecting a second pair of upper and lower pulse-height amplitude levels in said pulse-height analyzer, said second pair of levels being of substantially smaller width than said first pair of levels and lying approximately midway between said first pair of levels,
   (d) adjusting said high-voltage power supply to a first setting,
   (e) obtaining a first number of counts, detected by said scintillation counter as occurring within said second pair of levels, within a predetermined time period,
   (f) saving said first number of counts as a saved value,
   (g) adjusting said high-voltage power supply to a second setting different from said first setting,
   (h) obtaining a further number of counts, detected by said scintillation counter as occurring within said second pair of levels, within said predetermined time period,
   (i) comparing said further number of counts with said saved value to determine the larger thereof,
   (j) if said further number of counts is larger than said saved value, substituting said further number of counts as said saved value,
   (k) repeating said steps (g) through (j) for a predetermined number of times to determine, an overall maximum of said numbers of counts and said high-voltage setting corresponding thereto,
   (l) setting said high-voltage power supply to said high-voltage setting corresponding to said overall maximum of said number of counts, and
   (m) setting said pulse-height analyzer to detect counts lying between said first pair of pulse-height amplitude levels.

2. The method of claim 1 further comprising the step of providing a further radioisotope for performing said steps of obtaining said numbers of counts, said further radioisotope having a half-life substantially longer than said radioisotope.

3. The method of claim 1 further comprising the step of selecting said predetermined time period as four seconds.

4. The method of claim 1 further comprising the step of selecting said second pair of levels so as to have a width of approximately five kiloelectron volts.

5. Apparatus for use in calibrating a gamma counter including a scintillation counter providing output pulses and a high-voltage power supply for detecting the presence of a radioisotope, said apparatus further comprising:
   a pulse-height analyzer for receiving the output pulses of said scintillation counter, said pulse-height analyzer including means for setting a first pair of upper and lower pulse-height limits and a second pair of upper and lower pulse-height limits, said second pair of upper and lower pulse-height limits being separated by a smaller width than said first pair of upper and lower pulse-height limits, and being located substantially midway between said first pair of upper and lower pulse-height limits, said pulse-height analyzer further including selector means for selecting one of said first pair of upper and lower pulse height limits and said second pair of upper and lower pulse-height limits, respectively, said pulse-height analyzer providing as analyzer output pulses only those received output pulses of said scintillation counter which fall within said selected one of said first pair of upper and lower pulse-height limits and said second pair of upper and lower pulse-height limits, counting means connected to said pulse-height analyzer for counting the number of analyzer output pulses provided by said pulse-height analyzer to obtain a count output, and display means for displaying the count output of said counting means.

6. The apparatus of claim 5 further comprising timing means connected to said selector means for automatically actuating said selector means to select said second pair of upper and lower pulse-height limits for a first predetermined time and said second pair of upper and lower pulse-height limits for a second predetermined time following said first predetermined time.

7. The apparatus of claim 5 further comprising amplifier means connected between said scintillation counter and said pulse-height analyzer for amplifying said output pulses of said scintillation counter.

8. The apparatus of claim 5 further comprising gate means connected between said counting means and said display means for selectively gating said count output from said counting means to said display means.

9. The apparatus of claim 5 wherein said means for setting said first and second pairs of upper and lower pulse-height limits comprises:

first analog gate means for setting an upper pulse-height limit; and second analog gate means for setting a lower pulse-height limit, said pulse-height analyzer further comprising a first comparator and a second comparator, each having first and second inputs, said first inputs of said first and second comparators being connected to said scintillation counter for receiving the output pulses of said scintillation counter, said second inputs of said first and second comparators being connected to said first and second analog gate means, respectively.

10. The apparatus of claim 9 wherein said selector means comprises a flip-flop unit having an input connected to a start calibration switch and a first output connected to said first analog gate means and a second output connected to said second analog gate means.

* * * * *